United States Patent
Lee et al.

(10) Patent No.: US 7,284,074 B2
(45) Date of Patent: Oct. 16, 2007

(54) PIPELINED NETWORK PROCESSING WITH FIFO QUEUES

(75) Inventors: Eugene Lee, San Jose, CA (US); Cong Ye, Fremont, CA (US); Peter Chang, Fremont, CA (US); Ajoy Aswadhati, Cupertino, CA (US)

(73) Assignee: Force10 Networks, Inc., San Jose, CA (US)

( * ) Notice: Subject to any disclaimer, the term of this patent is extended or adjusted under 35 U.S.C. 154(b) by 699 days.

(21) Appl. No.: 10/286,361

(22) Filed: Oct. 31, 2002

(65) Prior Publication Data

US 2004/0088439 A1  May 6, 2004

(51) Int. Cl.
*G06F 5/00* (2006.01)
*G06F 3/00* (2006.01)
*G06F 13/00* (2006.01)

(52) U.S. Cl. .............................. 710/52; 710/54; 710/57
(58) Field of Classification Search .................... 710/5, 710/6, 29, 30, 52, 58; 709/232, 235
See application file for complete search history.

(56) References Cited

U.S. PATENT DOCUMENTS

| | | | |
|---|---|---|---|
| 6,351,468 B1 * | 2/2002 | LaRowe et al. ............ 370/449 |
| 6,571,301 B1 * | 5/2003 | Nakahara ..................... 710/31 |
| 6,762,995 B1 * | 7/2004 | Drummond-Murray et al. . 370/229 |
| 6,771,652 B1 * | 8/2004 | Aydemir et al. ............ 370/412 |
| 6,778,546 B1 * | 8/2004 | Epps et al. ................. 370/413 |
| 6,977,930 B1 * | 12/2005 | Epps et al. ................. 370/392 |
| 2004/0174813 A1 * | 9/2004 | Kasper et al. ............. 370/229 |
| 2005/0047334 A1 * | 3/2005 | Paul et al. ................. 370/229 |

* cited by examiner

*Primary Examiner*—Kim Huynh
*Assistant Examiner*—Scott Sun

(57) ABSTRACT

A system and method for operating on data within a network device is described. Between two data operations in a network device is a FIFO queue, which is used to separate the clock domains of the data operations. Data from the first operation is stored in the FIFO queue, which signals an indication to the second operation that there is data in the queue. When the second operation is signaled that there is data in the FIFO queue, it immediately begins reading data from the queue, and begins performing its prescribed operations on the data once it has read enough data from the queue for it to begin operating.

27 Claims, 4 Drawing Sheets

PIPELINED NETWORK PROCESSING WITH FIFO QUEUES

TECHNICAL FIELD

This disclosure relates to a system for network processing, and, more specifically, to a system including run and stop network processing having FIFO queues located between processing stages.

BACKGROUND

A network processing device uses a series of different stages to process incoming and outgoing data packets when the packets are arriving or are exiting the network device. For example, one stage may handle packet header processing, another may handle Medium Access Control (MAC) layer processing, yet another stage may handle Point to Point Protocol (PPP) processing and still another stage may handle High Level Data Link Control (HDLC) processing. Because these different network processing stages receive and process data at different data speeds, oftentimes a series of controlled First In-First Out (FIFO) buffers or queues are used between the different processing stages to help the data flow smoothly and timely through the network device.

Having FIFO queues helps data flow in a timely way through the network device. For example, the presence of a FIFO queue between two processing stages allows the stages to operate in different clock domains, i.e., to operate at different clock speeds, or to operate with clocks at the same speed but not synchronized to one another. By having a FIFO queue between stages with different clock domains, stages do not need to coordinate a data transmission from one stage to another. Instead, after completing its processing, the first stage simply deposits the packet on which it has just completed processing into the FIFO queue and notifies the second stage that the packet is now present in the queue. The second stage then retrieves the packet from the FIFO queue and begins processing the packet. This system uses less time than if the FIFO queues had to transfer data directly from one to the other.

A second reason for having FIFO queues between stages is that it is sometimes impossible to synchronize a single clock signal across a large number of different circuits or stages, due to capacitive loading, signal driving capabilities, etc., and therefore FIFO queues are used to isolate stages and allow them to operate relatively independently from one another.

Data arriving at a network processor generally does not arrive at regular intervals and, in fact, may arrive in sporadic chunks. Also, sometimes one or more of the network processing stages can have a short delay and data behind that stage becomes blocked. These types of data throughput inconsistencies can leave packets of data languishing in one or more of the FIFOs. If the data packets wait too long, the network device may drop one or more of the packets. When one of the stage processes has no data packets to process, it stops processing and waits for the next packet to be delivered to the FIFO queue, after which it receives a signal from the previous stage that data has been deposited in the FIFO queue, and the previously stopped stage starts running again. For this reason these processes are often called run and stop processes, and together the series of processes are known as the run and stop pipeline. These intermittent data transmissions cause delays in processing data in the network processing device, and generally lower performance of the network device.

The present invention addresses these and other problems associated with the prior art.

DETAILED DESCRIPTION OF PREFERRED EMBODIMENTS

Embodiments of the invention use a series of FIFO queues, each placed between two of many or all of the operational stages within a network device, both on the ingress and egress sides of the network device.

The ingress side of the network device encompasses all of the processing to data packets done between the time they are received at an input port from the data network, such as the Internet, and the time they are sent to the switch fabric. The switch fabric matches the incoming data packets to their destination output port, and moves packets from the ingress side of the network device to the egress side. The egress side of the network device encompasses all of the processing to the data packets done between the time they are output from the switch fabric, until the time they are sent back onto the data network from the output port.

Within each of the sides of the network device, ingress and egress, are a number of stages that perform different processes or functions, examples of which are given below. Embodiments of the invention include FIFO queues located between at least some of the processes, where a process that is just finishing sends its data, and where a process that is just beginning retrieves its data. The beginning process monitors the FIFO queue for the presence of data. Once data is deposited in the FIFO queue by the finishing process, the beginning process retrieves the data immediately, without waiting for any indication or signal from the finishing process that it deposited data in the FIFO queue. It is also unnecessary that the beginning process retrieve the entire packet of data from the FIFO queue before beginning to process the packet. Instead, once the beginning process has retrieved enough data from the FIFO queue to begin processing, the beginning process works on the data, even if the entire packet was not in the FIFO queue. Indeed, the beginning process may be operating on packet data retrieved from a FIFO queue while the finishing process is still storing the packet in the FIFO queue.

Figure 1:
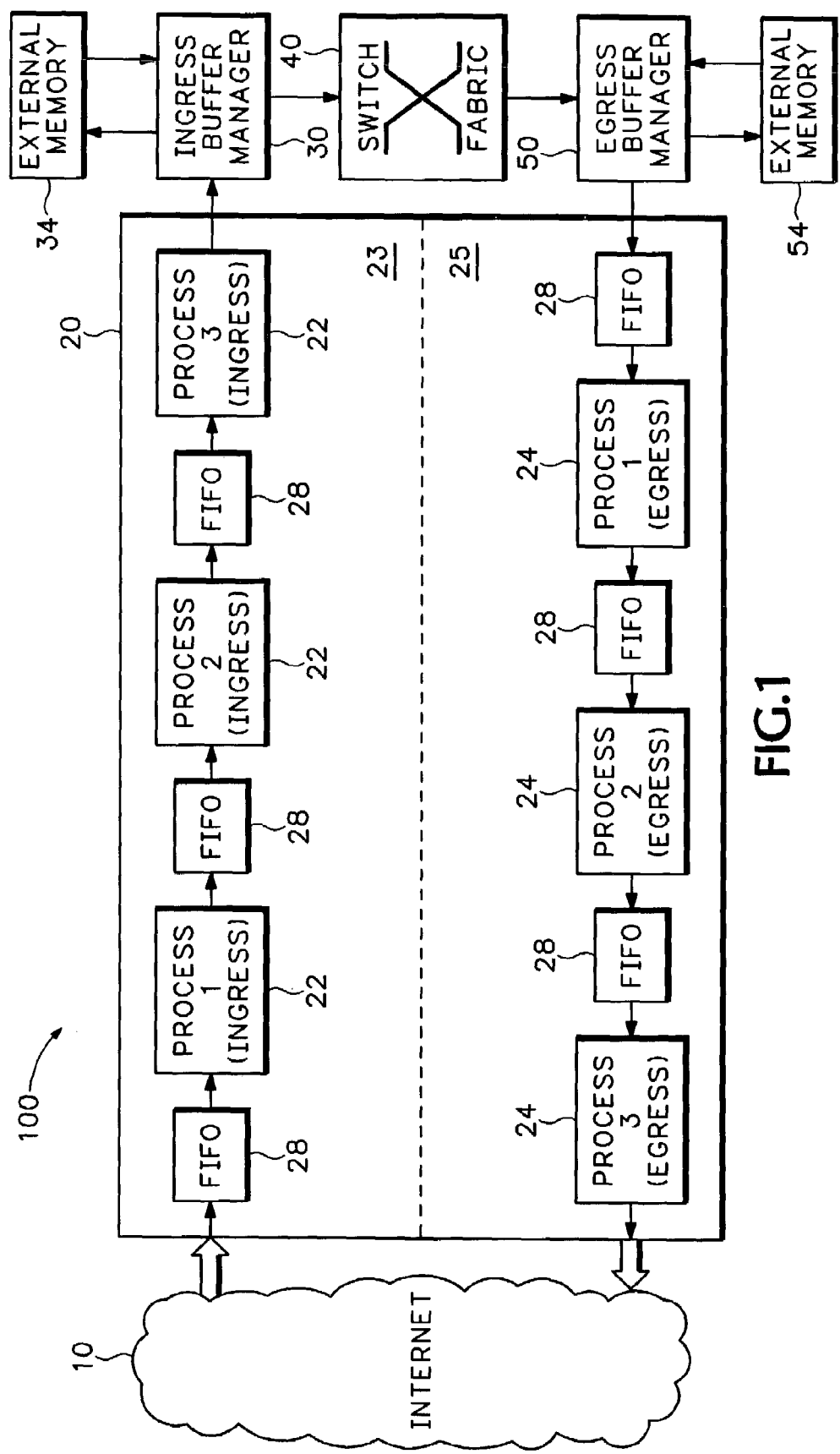
FIG. 1 is a block diagram of a network device according to an embodiment of the invention.

FIG. 1 shows a block diagram of a network system device 100, to more fully explain the environment in which embodiments of the invention operate. The network system device 100 is coupled to a computer network 10, such as the Internet. Included in the network device 100 is a network processor 20, which is coupled to a switch fabric 40 through an ingress buffer manager 30, and an egress buffer manager 50.

Within the network processor 20 is a series of individual ingress processes 22, collectively labeled as 23, and a series of egress processes 24, collectively labeled as 25. The series of ingress processes 23 encompasses the steps taken to guide packets from the time they enter the network processor 20 until the time they are transmitted to the ingress buffer manager 30. The ingress buffer manager 30 temporarily stores packets of data that are grouped to be sent to the same output port. The ingress buffer manager 30 may use external storage 34 to hold all of the waiting packets. Once the switch fabric 40 is available, the waiting packets are retrieved from the buffer manager 30, and sent through the switch fabric 40 where they are received and temporarily stored by an egress buffer manger 50. Similar to the ingress buffer manager 30, the egress buffer manager 50 may utilize external storage 54 to store packet data. These packets are then sent back to the network processor 20 and through the series of egress processes 25, which encompasses the steps taken to guide the packets from the time they are retrieved from the egress buffer manager 50, until the time they are sent out of the network processor 20 and back onto the computer network 10.

Between two adjacent individual ingress processes 22 and egress process 24 are FIFO queues 28. As described above, FIFO queues 28 are temporary buffers used to provide a good method for data delivery between two adjacent processes, but not requiring either process to negotiate directly with the other for the details of data transfer.

Figure 2:
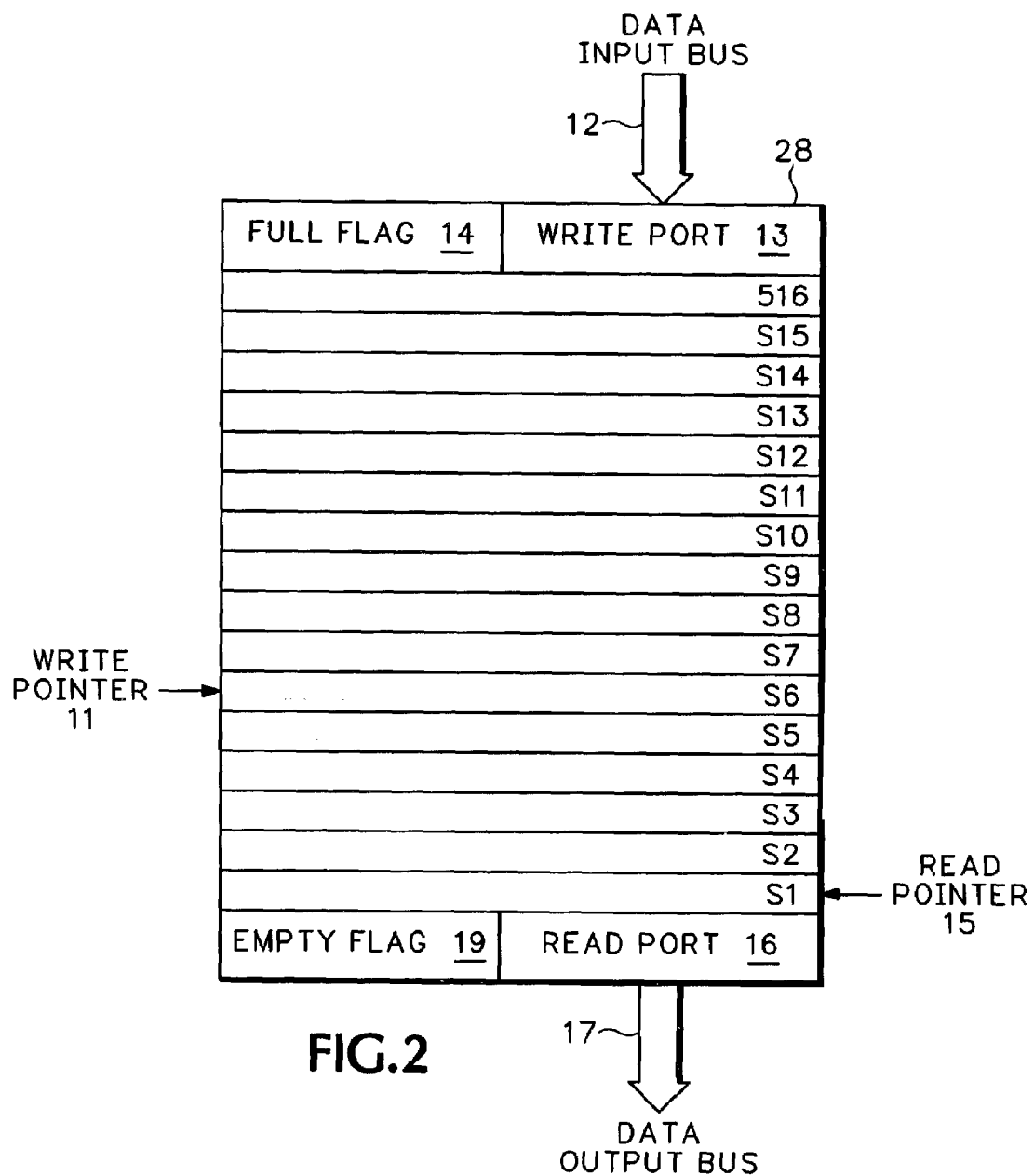
FIG. 2 is a block diagram of a FIFO queue used in embodiments of the invention.

An example of a FIFO queue 28 is shown in FIG. 2. The FIFO queue 28 has a data input bus 12 for sending incoming data to a write port 13, and also has a data output bus 17 on which is placed data that is retrieved from a read port 16. Data is written into the FIFO queue 28 from an outside source, such as a first ingress process 22, through the input bus 12 and is read from the FIFO queue by, for instance, a second ingress process 22 through the output bus 17. Data is always written to and read from the FIFO queue 28 sequentially, i.e., the first data to be written in the queue is also the first data to be read from the queue. There is no way to read data out of order. Data can be written into the FIFO queue 28 and read from the queue simultaneously, i.e. the reading process does not have to wait until the queue is free from being written to before reading data from it.

The FIFO queue 28 includes a write pointer 11, and a read pointer 15. The write pointer 11 indicates the position of where the next data that is written into the write port 13 will be stored, and the read pointer 15 indicates the position from where the next data to be read from the read port 16 will be retrieved. When the FIFO queue 28 is initialized, both the write pointer 11 and the read pointer 15 are set to point at the first data location in the queue. For purposes of this discussion, assume that the FIFO queue 28 has 16 data storage locations, numbered S1-S16. Therefore, when the FIFO queue 28 is initialized, both the write pointer 11 and the read pointer 15 will be pointing to storage location S1. Whenever the write pointer 11 and the read pointer 15 are pointing to the same data storage location, the FIFO queue 28 is empty.

In practice, the FIFO queue 28 can have any number of storage locations, and is only limited by the size of the physically implemented circuit. In addition to the number of storage locations in a FIFO queue, called 'depth', there are a certain number of bits for each storage location, called 'width'. Common sizes of FIFO queues 28 have a depth of between 64 and 512,000 storage locations, and have a width between 1 and 72 bits. The width of FIFO queues is selected to match the size needed by the application. In this description, a width of 32 bits, or 4 bytes is assumed, but embodiments of this invention are operable with FIFO queues 28 having any width or depth.

When data is written into the write port 13, it is automatically stored in the memory location of the FIFO queue 28 pointed to by the write pointer 11. For instance, if 16 bytes of data are written into a just-initialized FIFO queue 28, the data is written into storage locations S1-S4, and the write pointer 11 will then point to storage location S5. If no data has yet been read from the FIFO queue 28, the read pointer 15 will remain pointing at its initial location of storage location S1.

Both the write pointer 11 and the read pointer 15 are circular lists, in that, once they reach storage location S16 (in the example where there are only 16 storage locations), they will automatically loop back to pointing to the first storage location, number S1, without a need to perform a separate pointer reset.

Typically, the FIFO queue 28 also has flags to indicate the status of data in the queue. A full flag 14, when set, indicates that the FIFO queue 28 is full and can accept no more data until some of the data has been read from the queue. Conversely, an empty flag 19, when set, indicates that there is no data in the FIFO queue 28 to be read. When neither the full flag 14 nor the empty flag 19 are set, the FIFO queue 28 contains data. It is impossible for the full flag 14 and the empty flag 19 to be simultaneously set.

Figure 3:
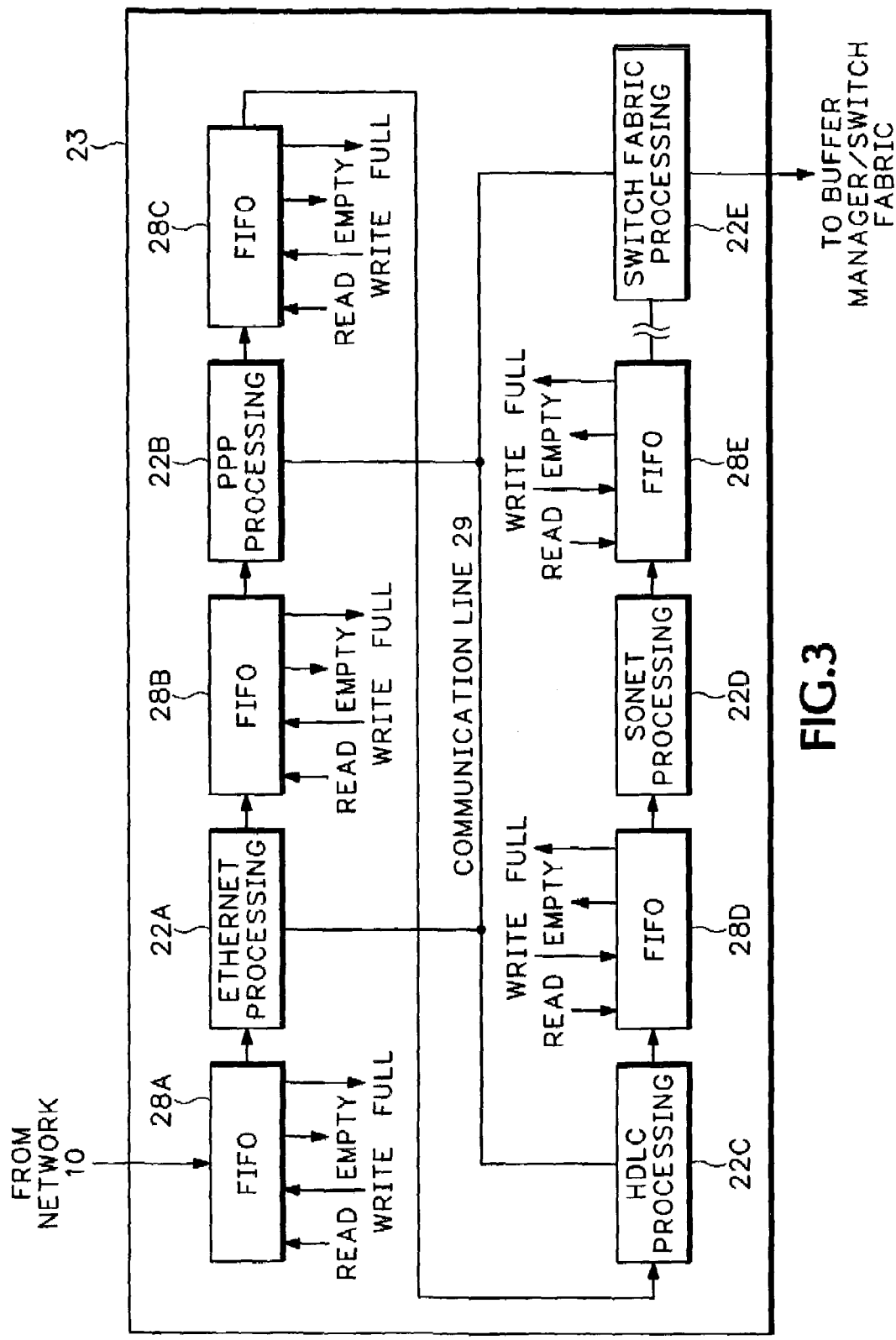
FIG. 3 is a block diagram of a network processor according to an embodiment of the invention.

FIG. 3 shows an example series of ingress processes 23 (also known as the ingress run and stop pipeline 23). To help explain operation of the FIFO queues 28 in the network processor 20, assume that there are five ingress processes 22 in the run and stop pipeline 23. The processes 22 are labeled 22A through 22E. There are also 5 FIFO queues 28, numbered 28A through 28E. The first FIFO queue 28A is located between the computer network 10 and the first ingress process 22A. The second FIFO queue 28B is located between the first ingress process 22A and the second ingress process 22B. This progression continues until the last ingress process is reached, 22E, which sends its data directly to the ingress buffer manager 30 to be forwarded on to the switch fabric 40.

When a data packet arrives from the computer network 10, it is immediately stored in the first FIFO queue 28A. As the data packet is written into the FIFO queue 28A, the write pointer 11 increments from its initial position of S1, and the empty flag 19 immediately changes to indicate that data is present in the FIFO queue 28A, even as the rest of the packet is being loaded into the queue. Data from the rest of the packet and from additional packets will continue to be written from the computer network 10 into the FIFO queue 28A as it arrives from the computer network 10, until the queue becomes full and can accept no more data. If the FIFO queue 28A becomes full with data, the full flag 14 of the FIFO queue 28 becomes set to signal that no more data can be stored in the queue. In practice FIFO queues are large enough to handle a very large amount of data, and only rarely would the first FIFO queue 28A in the ingress stop and go pipeline 23 be full.

The first ingress process 22A, which in this example is an Ethernet processor, monitors the empty flag 19 of the FIFO queue 28A to determine when data is stored in the queue. Once data begins to be stored in the FIFO queue 28A, the Ethernet processor 22A immediately reads the data from the queue and begins processing the data as soon as possible. Recall that data can be written to and read from the FIFO queue 28 simultaneously, so the Ethernet processor 22A can begin reading the data packet with very little delay. The Ethernet processor 22A begins processing the packet even if all of the packet data has not yet been read from the FIFO queue 28A, or indeed, even if all of the packet data has not yet been written into the FIFO queue 28A.

For instance, the Ethernet Processor 22A first parses the header information of the data packet. It is not immediately concerned with the data in the packet, other than the header data. Therefore, once the header of the current packet has been read from the FIFO queue 28A, the Ethernet Processor 22A can begin its operations of parsing the header, and initiate a destination address lookup in the routing tables, even before the entire packet has been read from the FIFO queue 28A. Recall too that the data must be read from a FIFO queue in the same order that it is written. Therefore, the Ethernet processor 22A need not wait until all of the data from a single packet has arrived, because it knows that the rest of the data will eventually arrive, and is guaranteed to be in order.

Once the Ethernet processor 22A has finished processing, it writes the data into the FIFO queue 28B. Prior to writing the data into the FIFO queue 28B, the Ethernet processor 22A must check the status of the full flag 14 of the queue. If the FIFO queue 28B is full, then the Ethernet processor 22A must stop processing, and wait until the queue 28B is no longer full. Once the FIFO queue 28B is ready to accept data, the Ethernet processor 22A can then precede writing data to the queue 28B.

Assume instead that the FIFO queue 28B is empty. In that case, the PPP processor 22B continuously monitors the empty flag 19 of the FIFO queue 28B, waiting for data to be written to the queue 28B. Immediately when the Ethernet processor 22A writes data into the FIFO queue 28B, its empty flag 19 changes to signal that data is in the queue. This, in turn, signals the PPP processor 22B, which begins reading the data from the FIFO queue 28B, and begins its processing of it. As in the case of the Ethernet processor 22A, the PPP processor 22B need not wait until the entire packet has been downloaded from the FIFO queue 28B in order to start processing the packet. Rather, the PPP processor 22B can begin processing the data as soon as the necessary data is read from the FIFO queue 28B. Of course, because different processors 22 process data from different parts of a data packet, one processor 22 may need to download more data from its respective FIFO queue 28 prior to beginning processing than other processors 22 need to download. In embodiments of the invention, each of the different processors 22 begin processing the data retrieved from its respective FIFO queue 28 as soon as it is able, i.e., as soon as it has enough data to proceed.

Embodiments of the invention, therefore, unlike prior network devices 100 that are limited by the size of the FIFO queues 28, are instead limited by the bandwidth of the processors 22. For example jumbo frames of data can be as large as 10,000 bytes each. If a network device 100 has a high number of input ports, then several hundred kilobytes of memory may be required to store the incoming packets. Instead of storing all the incoming packets prior to processing them, embodiments of the invention begin processing them as soon as the processors 22 are available, and do not even wait until the entire packet has been delivered prior to beginning processing. Therefore, in order to prevent a network device 100 from having a constantly increasing time lag of handling packets, the most complex of the ingress processors 22 and the egress processors 24 must operate faster than the rate at which data packets arrive at the network device.

Some of the ingress processors 22 cannot immediately modify the data on which they are working. For instance, when performing a lookup key, a request for a lookup may take a relatively long time period to return; certainly too long to wait on the response. In these circumstances, the ingress processors 22 are able to communicate with one another over a communication line 29 in the network processor 20. Although the communication line 29 is illustrated in FIG. 3 as a separate line or bus, this figure is only a functional diagram, and communication does not necessarily take place over a separate bus.

By using the communication line 29, data processing can be streamlined. For instance, if the Ethernet processor 22A performs a routing lookup, the data packet can continue to progress through the processes 22B, 22C, etc., before the lookup is sent back to the Ethernet processor 22A. The Ethernet processor 22A then places the lookup results on the communication line 29, and another process, such as 22D or 22E can insert the results back into the data packet. In this way, there is no delay by waiting for the response, but rather this parallelism (by performing the lookup at the same time as other processes are being performed) increases the overall bandwidth of the network device 100.

The communication line 29 also allows an easy way to collect statistical information on the data packets that are being serviced by the particular packets in the network processor 20. As a data packet is serviced, a quick write to the communication line 29 allows real-time data tracking of data in the network processor 20.

Figure 4:
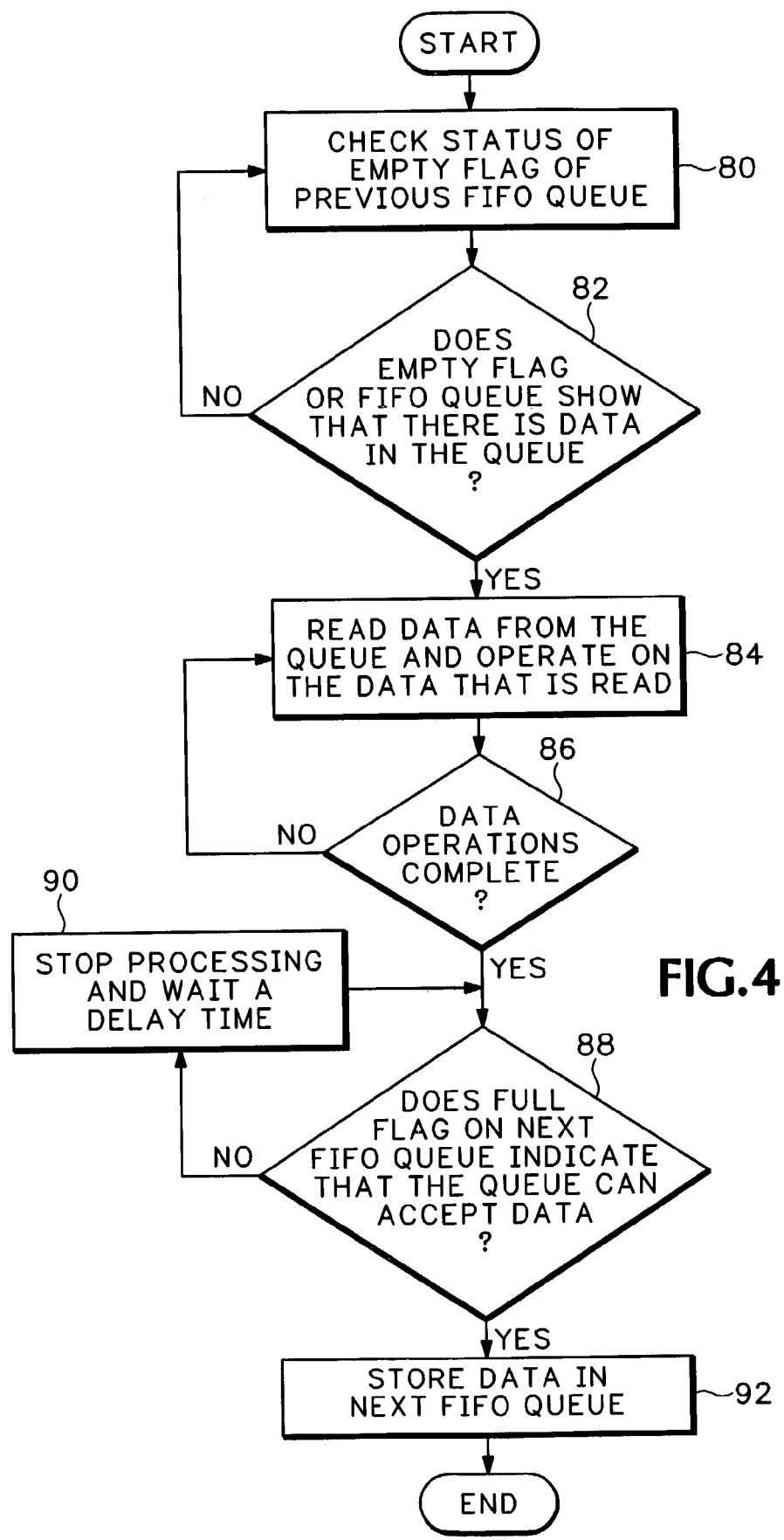
FIG. 4 is a flow diagram showing actions taken by one of the processes shown in FIG. 3.

FIG. 4 is a flow diagram showing operations in the individual input processors 22 of the ingress run and stop pipeline 23. The flow begins at step 80 where the input process 22 checks the empty flag 19 of the previous FIFO queue 28 to determine if any data is stored therein. For instance, the SONET processor 22D would be monitoring the FIFO queue 28D. As long as the FIFO queue 28 does not have any data, as checked in step 82, the flow returns back to step 80, and the monitoring continues. Once the FIFO queue 28D does have data, which, in this example, was deposited by the HDLC processing circuit 22C, the flow continues to step 84, where the data is read by the SONET processor 22D, and operated thereon. In step 84, not all of the data in the data packet must be written prior to the processor 22 beginning its operations.

While the SONET processor 22D is still reading and operating on the particular data packet, the flow loops between steps 84 and 86. Once the SONET processor 22D finishes operating on the data, it is ready to write the data to the next FIFO queue 28E. Prior to writing the data to the FIFO queue 28E, however, the SONET processor 22D checks to verify that the FIFO queue is not full, by checking the full flag 14 of the queue in step 88. If the FIFO queue 28E is full, the flow stops processing and delays for a short time in step 90, and then returns to step 88 to check the full flag 14 again. When the full flag 14 indicates that the FIFO queue 28E can accept data, the data is written into the queue in step 92. Of course, there are many ways to implement the flow shown in FIG. 4, and the shown method is not the only one that accords to the invention.

Although FIGS. 3 and 4 show examples of only the ingress stop and go pipeline 23, the operation of the FIFO queues 28 is equally applicable on the egress stop and go pipeline 25. Because most of the egress processes 24 are simply the ingress processes 22 performed in reverse, the interaction between the egress processes 24 and the FIFO queues 28 is either similar or identical, and embodiments of the invention are equally applicable.

Also, only a limited number of processes 22 in FIG. 3 are shown, but many more ingress processes 22 and egress processes 24 are typically in a network processor 20. For instance there are processes that perform header insertions and deletions, and those that perform encapsulations and decapsulations. Examples include VLAN, MPLS and TLS processing. Additionally, there are processes that perform Lookup Keys and return CMD processes. In these processes, and address can generate a lookup key by programmable microcode in addition or instead of a standard table search. Also, they can execute a return CMD (after the lookup) to process the packet header that can also be controlled by programmable microcode. Other processes include CRC generation and validation processes. In the case of a CRC check, a process 22 may send the entire packet from the process into the following FIFO queue 28 prior to performing the necessary functions on the CRC. Other processes can include IPv4 and IPv6 header checksum calculation and validation. Still other processes can include packet filtering, and QOS processing. All of these processes, and others, and future processes, are compatible with embodiments of the invention, and are specifically contemplated.

The system described above can use dedicated processor systems, micro controllers, programmable logic devices, or microprocessors that perform some or all of the processing functions. Some of the operations described above may be implemented in software and other operations may be implemented in hardware.

Of course there can be many or few FIFOs in the network processor. It may be beneficial have some of the processes communicate directly with one another without using a FIFO queue, while others are better suited to communicate via FIFO queues. As always, implementation is left to the system designer, and many of the specific details may be best determined empirically.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A network device, comprising:
an input port adapted to be coupled to a computer network and structured to receive packets of data;
a first FIFO queue coupled to the input port and structured to store the received packets of data;
a first ingress process coupled to the first FIFO queue, the first ingress process configured to monitor an empty flag on the first FIFO queue and initiate reading data from the first FIFO queue when the empty flag signals there is data in the first FIFO queue;
a second FIFO queue coupled to the first ingress process and structured to store data from the first ingress process;
a second ingress process coupled to the second FIFO queue, the second ingress process configured to monitor an empty flag on the second FIFO queue and initiate reading data from the second FIFO queue when the empty flag signals there is data in the second FIFO queue;
a switch fabric coupled to the second ingress process;
a third FIFO queue coupled to the switch fabric and structured to accept a stream of data from the switch fabric grouped in data packets;
a first egress process coupled to the third FIFO queue and structured to monitor an empty flag on the third FIFO queue and initiate reading data from the third FIFO queue when the empty flag of the third FIFO queue indicates that there is data in the third FIFO queue;
a fourth FIFO queue coupled to the first egress process and structured to store data output by the first egress process; and
a second egress process coupled to the fourth FIFO queue and configured to monitor an empty flag on the fourth FIFO queue and initiate reading data from the fourth FIFO queue when the empty flag of the fourth FIFO queue indicates that there is data in the fourth FIFO queue.

2. The network device of claim 1, wherein the second ingress process is configured to read data from the second FIFO queue before an entire data packet has been stored into the second FIFO queue.

3. The network device of claim 1, wherein the second ingress process is configured to begin processing data retrieved from the second FIFO queue before it retrieves an entire data packet from the second FIFO queue.

4. The network device of claim 1, wherein neither the first or second ingress processes nor the first or second egress processes operate in the same clock domain.

5. The network device of claim 1, further comprising a first communication line coupled to the first ingress process and the second ingress process and configured to transfer data other than the packets of data from one ingress process to the other separate from the second FIFO queue.

6. The network device of claim 5, further comprising a second communication line coupled to the first egress process and the second egress process and configured to transfer data from one egress process to the other separate from the fourth FIFO queue.

7. The network device of claim 1, wherein one or more of the FIFO queues comprise:
a write bus coupled to a write port;
a read bus coupled to a read port;
a plurality of storage locations to store data each coupled to the write port and the read port;
a write pointer configured to indicate in which of the plurality of storage locations the next data written to the write port will be stored;
a read pointer configured to indicate from which of the plurality of storage locations the next data read from the read port will be retrieved;
a full flag configured to indicate when all of the plurality of storage locations have data stored in them; and
an empty flag configured to indicate when none of the plurality of storage locations have data stored in them.

8. A method of processing data in a network device, comprising:
reading packet data for a current packet from a first queue without waiting for all packet data from the current packet to be deposited in the first queue;
beginning performing a data operation for the current packet when enough packct data has been read from the first queue by a first process to begin performing the data operation, wherein for at least some packets the data operation is begun before all packet data from the current packet is deposited in the first queue;
completing the data operation by the first process;
storing the packet data that has been operated on by the first process into a second queue;

monitoring the second queue by a second process to determine when data has been stored in the second queue; and retrieving data from the second queue by the second process when data has been stored in the second queue.

9. The network device of claim 8, wherein the second process is configured to read data from the second queue before an entire data packet has been deposited into the second queue.

10. The network device of claim 8, wherein the second process is configured to begin processing data read from the second queue before an entire data packet has been read from the second queue.

11. The method of claim 8 wherein monitoring a second queue by a second process comprises monitoring an empty flag of the second queue.

12. The method of claim 8, wherein the first process and the second process operate in different clock domains.

13. The method of claim 8, further comprising communicating between the first process and the second process over a communication line separate from the first queue and the second queue.

14. The method of claim 8 wherein storing the data that has been operated on by the first process into a second queue comprises:
   checking a full flag on the second queue; and
   when the full flag indicates that the second queue is not full, storing the data into the second queue.

15. The method of claim 8, wherein at least one of the queues comprises:
   a write bus coupled to a write port;
   a read bus coupled to a read port;
   a plurality of storage locations to store data each coupled to the write port and the read port;
   a write pointer configured to indicate in which of the plurality of storage locations the next data written to the write port will be stored;
   a read pointer configured to indicate from which of the plurality of storage locations the next data read from the read port will be retrieved;
   a full flag configured to indicate when all of the plurality of storage locations have data stored in them; and
   an empty flag configured to indicate when none of the plurality of storage locations have data stored in them.

16. The method of claim 8, further comprising deencapsulating data retrieved from the second queue.

17. The method of claim 8, further comprising validating the CRC data of a data packet retrieved from the second queue.

18. The method of claim 8, further comprising performing a checksum operation on data retrieved from the second queue.

19. The method of claim 8, further comprising looking up key values for data retrieved from the second queue.

20. A method of processing data in a network device, comprising:

performing a data operation, by a first process, on data within a current data packet;

checking a full flag on a queue that is coupled to the first process to determine if the queue is full of data;

storing the operated-on data for the current data packet in the queue when the full flag indicates that the queue is not full;

monitoring an empty flag of the queue by a second process to determine when data has been stored in the queue;

retrieving data from the queue by the second process when data has been stored in the queue, without waiting for all operated-on packet data from the current packet to be deposited in the queue; and beginning operating on the data from the queue when enough data has been retrieved from the queue, wherein for at least some packets the operating is begun before all packet data from the current packet is stored in the queue.

21. The method of claim 20, wherein operating on the data from the queue comprises stripping a header from data retrieved from the queue.

22. The method of claim 20, wherein operating on the data from the queue comprises performing a table lookup on data retrieved from the queue.

23. The method of claim 20, wherein operating on the data from the queue comprises performing a CRC validation on data retrieved from the queue.

24. The method of claim 20, wherein operating on the data from the queue comprises encapsulating data retrieved from the queue into an encapsulated data packet.

25. The method of claim 20, wherein the first process and the second process operate in different clock domains.

26. The method of claim 20, further comprising communicating between the first process and the second process over a communication line separate from the queue.

27. The method of claim 20, wherein the queue comprises:
   a write bus coupled to a write port;
   a read bus coupled to a read port;
   a plurality of storage locations to store data each coupled to the write port and the read port;
   a write pointer configured to indicate in which of the plurality of storage locations the next data written to the write port will be stored;
   a read pointer configured to indicate from which of the plurality of storage locations the next data read from the read port will be retrieved;
   a full flag configured to indicate when all of the plurality of storage locations have data stored in them; and
   an empty flag configured to indicate when none of the plurality of storage locations have data stored in them.

* * * * *